(12) United States Patent
Ayyappan

(10) Patent No.: US 10,676,131 B2
(45) Date of Patent: Jun. 9, 2020

(54) METHOD FOR AT LEAST SEMI-AUTONOMOUSLY MANOEUVRING A MOTOR VEHICLE WITH POSITION CORRECTION, DRIVER ASSISTANCE SYSTEM AND MOTOR VEHICLE

(71) Applicant: VALEO Schalter und Sensoren GmbH, Bietigheim-Bissingen (DE)

(72) Inventor: Thirumalai Kumarasamy Ayyappan, Bietigheim-Bissingen (DE)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 202 days.

(21) Appl. No.: 15/747,970

(22) PCT Filed: Jul. 19, 2016

(86) PCT No.: PCT/EP2016/067190
§ 371 (c)(1),
(2) Date: Jun. 1, 2018

(87) PCT Pub. No.: WO2017/016935
PCT Pub. Date: Feb. 2, 2017

(65) Prior Publication Data
US 2018/0265129 A1  Sep. 20, 2018

(30) Foreign Application Priority Data

Jul. 28, 2015 (DE) .......................... 10 2015 112 313

(51) Int. Cl.
*B62D 15/02* (2006.01)
*G01S 15/931* (2020.01)
(52) U.S. Cl.
CPC ...... *B62D 15/027* (2013.01); *G01S 2015/933* (2013.01)

(58) Field of Classification Search
CPC .................. B62D 15/027; G01S 2015/933
See application file for complete search history.

(56) References Cited

U.S. PATENT DOCUMENTS

2009/0001740 A1* 1/2009 Kofoed ..................... A61G 7/08
296/20
2010/0332080 A1* 12/2010 Bae ........................ B62D 15/028
701/42
(Continued)

FOREIGN PATENT DOCUMENTS

DE    10 2006 060 456 A1    8/2007
DE    10 2009 039 085 A1    3/2011
(Continued)

OTHER PUBLICATIONS

International Search Report issued in PCT/EP2016/067190 dated Nov. 9, 2016 (2 pages).

(Continued)

*Primary Examiner* — Russell Frejd
(74) *Attorney, Agent, or Firm* — Osha Liang LLP

(57) ABSTRACT

The invention relates to a method for at least semi-autonomously manoeuvring a motor vehicle (1), in which a sensor (4) is used to determine a position value describing a current relative position between an object (8) in an area (7) surrounding the motor vehicle (1) and the motor vehicle (1), a driving trajectory (13) is determined, the motor vehicle (1) is manoeuvred along the determined driving trajectory (13), the position value is continuously updated during manoeuvring of the motor vehicle (1) on the basis of odometry, and contact between at least one wheel of the motor vehicle (1) and the object (8) is detected, wherein the position value is corrected if the contact between the at least one wheel and the object (8) is detected and the position value describes a (Continued)

relative position which differs from the contact between the at least one wheel and the object (8).

12 Claims, 3 Drawing Sheets

(56) References Cited

U.S. PATENT DOCUMENTS

| | | | | |
|---|---|---|---|---|
| 2014/0195112 A1* | 7/2014 | Lu | ........................ | B60G 17/015 |
| | | | | 701/37 |
| 2014/0330483 A1* | 11/2014 | Lu | ........................ | B60G 17/015 |
| | | | | 701/37 |
| 2016/0236680 A1* | 8/2016 | Lavoie | .................. | B60W 30/06 |

FOREIGN PATENT DOCUMENTS

| | | |
|---|---|---|
| DE | 10 2009 047 248 A1 | 6/2011 |
| DE | 10 2011 103 096 A1 | 12/2012 |
| DE | 10 2012 014 809 A1 | 1/2014 |
| EP | 2 689 990 A2 | 1/2014 |
| JP | 2014-101101 A | 6/2014 |

OTHER PUBLICATIONS

Written Opinion of the International Searching Authority issued in PCT/EP2016/067190 dated Nov. 9, 2016 (6 pages).
German Search Report issued in DE 10 2015 112 313.4 dated Jun. 15, 2016 (10 pages).

* cited by examiner

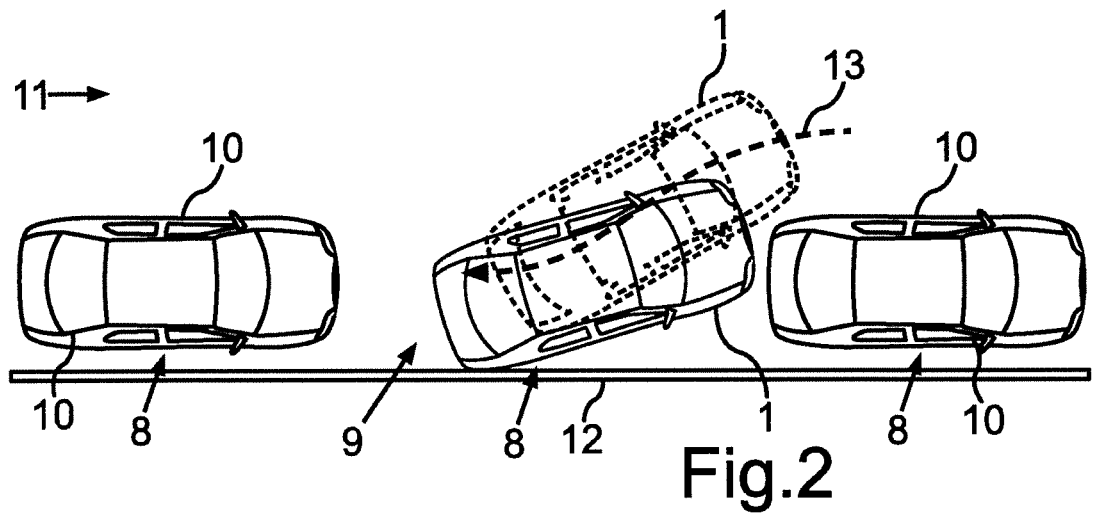
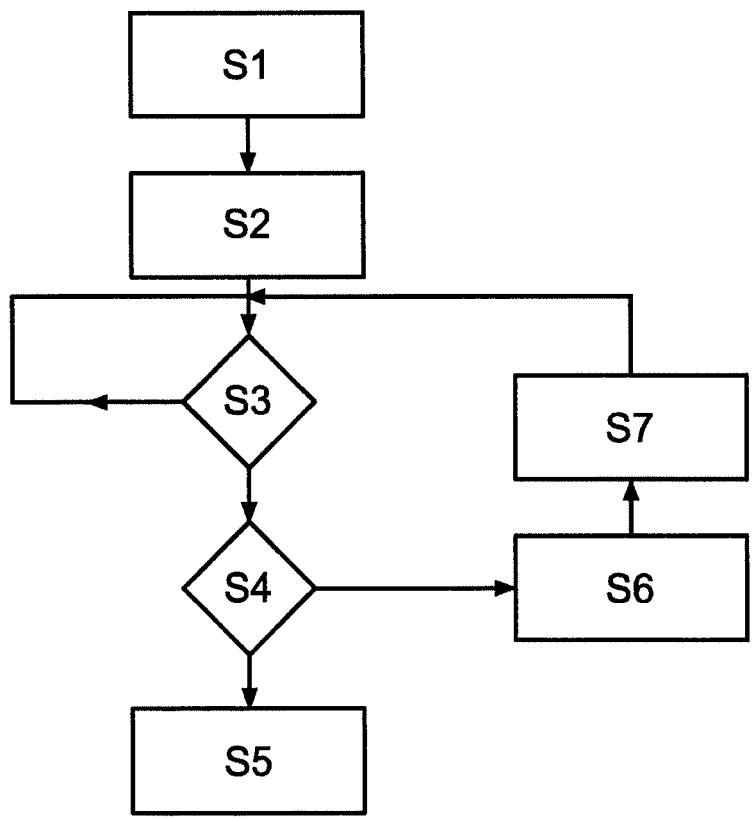

METHOD FOR AT LEAST SEMI-AUTONOMOUSLY MANOEUVRING A MOTOR VEHICLE WITH POSITION CORRECTION, DRIVER ASSISTANCE SYSTEM AND MOTOR VEHICLE

The present invention relates to a method for at least semi-autonomously manoeuvring a motor vehicle, in which a sensor is used to determine a position value describing a current relative position between an object in an area surrounding the motor vehicle and the motor vehicle, a driving trajectory is determined, the motor vehicle is manoeuvred along the determined driving trajectory, the position value is continuously updated during manoeuvring of the motor vehicle on the basis of odometry, and contact between at least one wheel of the motor vehicle and the object is detected. The present invention also relates to a driver assistance system for a motor vehicle. Finally, the present invention relates to a motor vehicle having such a driver assistance system.

In the present case, interest focuses, in particular, on driver assistance systems which assist the driver when manoeuvring the motor vehicle and, in particular, when parking the motor vehicle in a parking space. Driver assistance systems which can detect parking spaces or available parking spaces with the aid of corresponding sensors and assist the driver during the parking operation are already known from the prior art. In this case, the driver can be assisted both during longitudinal parking and during lateral parking. Driver assistance systems which semi-autonomously manoeuvre the motor vehicle during a parking operation are also known. In this case, the driver assistance system steers the motor vehicle and the driver actuates the accelerator pedal and the brake. Driver assistance systems which make it possible to autonomously or fully autonomously manoeuvre the motor vehicle are also already known.

Driver assistance systems which assist the driver during parking manoeuvres in which a kerb is driven over are also known from the prior art. This is the case, for example, if the motor vehicle is moved during parking in such a manner that the at least one wheel of the motor vehicle is moved over a kerb. In this case, it is also of interest to detect contact between the at least one wheel and the kerb. For this purpose, the torque provided by a drive motor can be captured, for example. The contact between the at least one wheel and the kerb can be detected on the basis of a change in the torque.

In addition, DE 10 2012 014 809 A1 describes a method for detecting when a motor vehicle drives over a kerb during a manoeuvring operation at a speed of less than or equal to 10 km/h. In this case, wheel sensors of the wheels of the motor vehicle are each used to determine a wheel speed and a direction of travel. It is identified that a kerb is driven over if one wheel has a positive acceleration for a predefined interval of time and at least one of the other wheels has a negative acceleration for the same period. Furthermore, the detection of when a kerb is driven over is used to correct an odometric determination of the position and to calculate trajectories of a parking assistant.

The object of the present invention is to show a solution of how a motor vehicle can be manoeuvred in a more reliable manner, in particular during parking in a parking space.

This object is achieved, according to the invention, by means of a method, a driver assistance system and a motor vehicle having the features according to the respective independent claims. The dependent claims, the description and the figures relate to advantageous embodiments of the invention.

A method according to the invention is used to at least semi-autonomously manoeuvre a motor vehicle. In this case, a sensor is used to determine a position value describing a current relative position between an object in an area surrounding the motor vehicle and the motor vehicle. Furthermore, a driving trajectory is determined, and the motor vehicle is manoeuvred along the determined driving trajectory. In addition, the position value is continuously updated during manoeuvring of the motor vehicle on the basis of odometry, and contact between at least one wheel of the motor vehicle and the object is detected. In this case, provision is also made for the position value to be corrected if the contact between the at least one wheel and the object is detected and the position value describes a relative position which differs from the contact between the at least one wheel and the object.

The method is intended to be used to at least semi-autonomously manoeuvre the motor vehicle. In particular, the method is used to assist the driver when parking the motor vehicle in a parking space. The object in the surroundings of the motor vehicle is captured by means of a sensor of the motor vehicle. In this case, provision may also be made for a plurality of sensors of the motor vehicle to be used to capture the object in the surrounding area. The at least one sensor may be an ultrasonic sensor, for example. A relative position between the object and the motor vehicle can be determined on the basis of the sensor data provided by the sensor. A control device, in particular an electronic control unit, of the motor vehicle can be used, for example, to determine the relative position. The data from different sensors can be used for this purpose. Provision may also made for the motor vehicle to be moved relative to the object and for the distance between the motor vehicle and the object to be determined at different times. A position value which describes the current relative position between the motor vehicle and the object of the motor vehicle can then be determined therefrom.

In addition, the driving trajectory along which the motor vehicle is moved can be determined by means of the control device. In this case, the driving trajectory can be determined in such a manner that it leads to the object or in the direction of the object. During the journey of the motor vehicle along the driving trajectory, the position value is continuously updated on the basis of odometry. The current vehicle position can be determined by means of the odometry. For this purpose, a number of wheel revolutions carried out by the at least one wheel can be determined, for example, starting from a starting point of the driving trajectory at which the position value is initially determined. The distance covered by the motor vehicle can then be determined on the basis of the known dimensions of the wheel. Furthermore, the data from a steering angle sensor and/or a yaw rate sensor of the motor vehicle can be used to determine the direction of travel or orientation of the motor vehicle during manoeuvring. Therefore, the vehicle position and therefore also the relative position or the position value can be continuously updated during the journey of the motor vehicle along the driving trajectory.

The invention now provides for a check to be carried out in order to determine whether there is contact between the at least one wheel and the object. If the contact has been detected, the position value is corrected. In particular, the position value is corrected if the contact between the wheel and the object is detected and the position value indicates that the motor vehicle is at a predetermined distance from the object. The position value can describe, in particular, the distance between the motor vehicle and the object with respect to two spatial directions which are perpendicular to one another. If the position value indicates that at least one of these distances is greater than zero, it can be assumed that the position value has been incorrectly determined. The position value is corrected in this case. It may also be the case that the position value indicates that there is already contact between the wheel and the object, but this is not yet the case in reality. In this case, the position value can be corrected when the object is reached. This makes it possible to detect, in particular, an error in the odometry which arose when driving the motor vehicle up to the object along the driving trajectory. This error can be eliminated by correcting the position value and the motor vehicle can therefore then be correctly and reliably manoeuvred.

If the contact between the at least one wheel and the object is detected, a difference between an actual relative position between the motor vehicle and the object and the relative position described by the position value is preferably determined and the position value is corrected on the basis of the determined difference. If there is contact between the at least one wheel and the object, it can be assumed that the distance between this wheel and the object is equal to zero. The position value which describes, in particular, a current distance between the motor vehicle and the object with respect to two spatial directions can also be examined. The position value can describe, for example, that the distance between the object and the at least one wheel has a first distance along the first spatial direction and has a second distance along the second spatial direction. The first and second distances can then be used to correct the determined position value. In other words, a correction value or a correction factor is therefore determined for the position value. The position value can therefore be reliably corrected and odometry errors can therefore be compensated for.

It is also advantageous if the difference is determined on the basis of dimensions of the at least one wheel and/or a position of the at least one wheel relative to a predetermined reference point of the motor vehicle. The dimensions of the motor vehicle may be stored in a storage unit of the control device, for example. The dimensions of the wheels of the motor vehicle, in particular, may be stored there. In addition, it is possible to store the dimensions and/or the position of the wheels with respect to a predetermined reference point of the motor vehicle, which may be at the centre of the rear axle of the motor vehicle, for example. Therefore, if the at least one wheel touches the object, the relative position of the point at which the wheel touches the object and of the reference point can be determined. In this case, provision may be made, for example, for an angle of a vehicle longitudinal axis and of the object to be determined. The touching point can therefore be determined in a more accurate manner. If the at least one wheel is a steerable wheel of the motor vehicle, a current steering angle can also be determined in order to be able to determine the touching point in a more accurate manner. This makes it possible to precisely correct the position value.

According to another embodiment, a digital environmental map which describes the surrounding area is provided, and a position of the motor vehicle and/or of the object in the environmental map is adapted on the basis of the corrected position value. The current position of the motor vehicle and/or of the object can be entered in the digital map. In addition, the spatial dimensions of the motor vehicle and/or of the object may be stored in the digital map. These data can be adapted on the basis of the corrected position value. A driver assistance system which resorts to the digital environmental map can therefore be reliably operated, for example.

In another embodiment, the sensor is also used to detect a parking space in the surrounding area, and the driving trajectory for parking the motor vehicle in the parking space is determined. The parking space may be, in principle, a parking space for longitudinal parking, for lateral parking or for angular parking. The control device may accordingly evaluate the sensor data provided by the sensor, for example. Objects which border the parking space, for example, can therefore be detected. In this case, the object may be inside the parking space and/or may border the parking space. The driver of the motor vehicle can therefore be reliably assisted when parking in a parking space.

A kerb which borders the parking space or is arranged inside the parking space is preferably detected as the object. In the present case, parking operations in which at least one wheel of the motor vehicle touches a kerb are of interest, in particular. The kerb is used, in particular, to delimit different areas of the street from one another. For example, a road may be delimited from another area of the street by means of the kerb. Such a parking operation is present, for example, if the parking space is bordered by a kerb. This situation may also be present if at least one wheel is moved over the kerb or is moved onto the kerb during parking in the parking space. This is the case, in particular, if the parking space is, at least in certain areas, in an area delimited from a road by the kerb. The relative position between the motor vehicle and the kerb can therefore be determined. The position value can be continuously updated during manoeuvring of the motor vehicle and the position value can be corrected in the event of contact between the at least one wheel and the kerb.

A motor speed of a drive motor of the motor vehicle is preferably captured, and the contact between the at least one wheel and the object is detected on the basis of an increase in the motor speed. In order to detect when the at least one wheel touches the object or the kerb, a motor speed of a drive motor of the motor vehicle can be continuously captured. The drive motor may be, for example, an internal combustion engine or an electric motor. The drive motor is used to drive the at least one wheel of the motor vehicle. If the motor speed changes, the contact between the at least one wheel and the object is detected. This is based on the knowledge that the object is an obstacle to the at least one wheel of the motor vehicle and must be overcome, for example. If the at least one wheel is intended to roll onto the kerb, the speed of the drive motor must be increased. The practice of capturing the change in speed, in particular an increase in the speed, for the purpose of detecting when the object is touched has the advantage that the motor speed of the drive motor can be easily and reliably captured. The current motor speed is usually continuously measured in motor vehicles, with the result that no conversions, for example, have to be carried out in order to determine the motor speed. This makes it possible to quickly and reliably detect the contact between the at least one wheel and the kerb.

According to another embodiment, a direction of rotation of the at least one wheel is captured, and the contact between the at least one wheel and the object is detected on the basis of the captured direction of rotation. In this case, it is possible to check, in particular, whether the at least one wheel changes its direction of rotation. This is the case, for example, if the wheel is moved in the direction of the object and then strikes the object. The contact between the at least one wheel and the object or the kerb can then be reliably detected on the basis of the negative wheel revolutions.

A current speed of the motor vehicle is preferably captured, and the contact between the at least one wheel and the object is additionally detected on the basis of a change in the captured speed. It is also advantageous if a speed at which the motor vehicle is moved along the determined driving trajectory is controlled. In other words, a desired speed can be predefined along the driving trajectory, to which the speed of the motor vehicle is controlled. In this case, the motor vehicle can be moved at the desired speed in the direction of the kerb, for example. In this case, it is possible to check, for example, whether the speed of the motor vehicle abruptly decreases. This is the case, in particular, if the wheel touches the kerb and the motor vehicle is decelerated thereby. In addition, provision may also be made for a control deviation of a cruise control system of the motor vehicle to be monitored. It can then be inferred that the kerb has been touched on the basis of this control deviation.

It is also advantageous if a torque provided by the drive motor is captured, and the contact between the at least one wheel and the object is additionally detected on the basis of a change in the captured torque. The torque currently provided by the drive motor can be derived, for example, on the basis of the data from a motor control unit. It is therefore possible to detect, for example, that the torque has an increase. If there is such an increase in the torque, it can be detected from this that the kerb is touching the at least one wheel. This makes it possible to reliably detect the contact between the wheel and the kerb.

If the contact between the at least one wheel and the object is detected, it is also advantageous if a torque provided by the drive motor for driving the at least one wheel is increased. In this case, the at least one wheel itself or an axle connected to the at least one wheel in a rotationally fixed manner can be driven using the drive motor. An additional torque can be provided by the drive motor after a time at which the contact is detected. In the case of a kerb, it can therefore be ensured that the at least one wheel can be moved over the kerb or the kerbstone.

According to another embodiment, the torque is increased as long as the change in the motor speed is captured. In this case, it is possible to check, for example, whether the motor speed exceeds a predetermined threshold value. It is also possible to check whether the motor speed has an increase. The torque can be increased, for example, only as long as the motor speed has an increase. If the motor speed has a drop again, for example, or decreases, it can be assumed that the at least one wheel has already rolled over the kerbstone. If the increased torque is provided only as long as the motor speed increases, it can be guaranteed that the motor vehicle is not accelerated after driving over the kerb.

A driver assistance system according to the invention for a motor vehicle is designed to carry out a method according to the invention. The driver assistance system preferably comprises a sensor, in particular an ultrasonic sensor, which can be used to capture objects in the area surrounding the motor vehicle. The at least one sensor may also be in the form of a camera, a radar sensor, a lidar sensor or the like. The driver assistance system may also comprise a corresponding control device, for example an electronic control unit of the motor vehicle. The control device can be used to detect the parking space on the basis of the sensor data provided by the sensor. The driving trajectory can also be determined using the control device.

A motor vehicle according to the invention comprises a driver assistance system according to the invention. The motor vehicle is in the form of a passenger car, in particular.

The preferred embodiments and their advantages presented with respect to the method according to the invention accordingly apply to the driver assistance system according to the invention and to the motor vehicle according to the invention.

Further features of the invention emerge from the claims, the figures and the description of the figures. The features and combinations of features mentioned in the description above and the features and combinations of features mentioned in the description of the figures below and/or shown in the figures alone, can be used not only in the respectively stated combination, but also in other combinations or alone without departing from the scope of the invention. Embodiments of the invention which are not explicitly shown and explained in the figures but are clear and can be produced by means of separated combinations of features from the embodiments explained should therefore also be considered to have been included and disclosed. Embodiments and combinations of features which therefore do not have all features of an originally formulated independent claim can also be considered to have been disclosed.

The invention is now explained in more detail on the basis of preferred exemplary embodiments and with reference to the accompanying drawings.

In the drawings:

FIG. 2 shows the motor vehicle according to FIG. 1, which is being parked in a parking space;

FIG. 3 shows a schematic flowchart of a method for at least semi-autonomously manoeuvring the motor vehicle.

In the figures, identical and functionally identical elements are provided with the same reference symbols.

Figure 1:
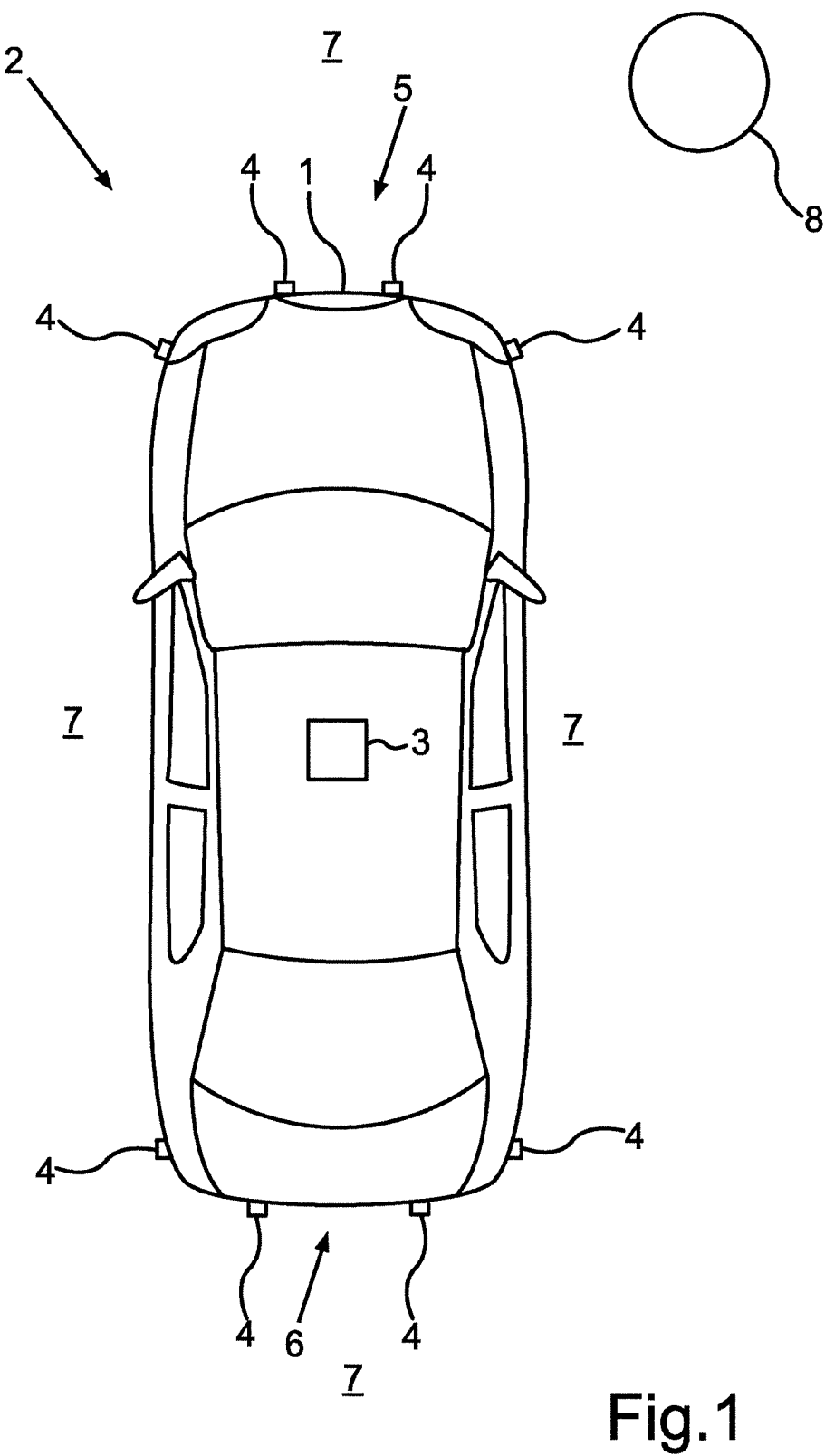
FIG. 1 shows a motor vehicle according to one embodiment of the present invention, which has a driver assistance system.

FIG. 1 shows a plan view of a motor vehicle 1 according to one embodiment of the present invention. In the present case, the motor vehicle 1 is in the form of a passenger car. The motor vehicle 1 comprises a driver assistance system 2. The driver assistance system 2 in turn comprises a control device 3 which may be formed, for example, by an electronic control unit (ECU) of the motor vehicle 1. The driver assistance system 2 also comprises at least one sensor 4.

In the present case, the driver assistance system 2 comprises eight sensors 4 which are each in the form of ultrasonic sensors. In this case, four sensors 4 are arranged in a front area 5 of the motor vehicle 1 and four sensors 4 are arranged in a rear area 6 of the motor vehicle 1. The sensors 4 are designed to capture at least one object 8 in an area 7 surrounding the motor vehicle 1. The sensors 4 are used, in particular, to determine a relative position between the object 8 and the motor vehicle 1. The sensors 4 may be arranged, for example, at corresponding passage openings in the bumpers of the motor vehicle 1. Provision may also be made for the sensors 4 to be arranged in a manner concealed behind the bumpers.

FIG. 2 shows the motor vehicle 1 which is being parked in a parking space 9. In the present case, the parking space 9 is bordered by two further vehicles 10. In order to detect the parking space 9, the motor vehicle 1 may be moved past the vehicles 10, for example on a road 11. During the movement of the motor vehicle 1, the area 7 surrounding the motor vehicle 1 can be continuously captured using the sensors 4 and in this case the further vehicles 10 can be detected as the objects 8. In this case, the clearance between the further vehicles 10 can be measured and can therefore be detected as a parking space 9. On the basis of a current position of the motor vehicle, it is possible to determine a driving trajectory 13 along which the motor vehicle 1 is moved into the parking space 9.

The movement of the motor vehicle 1 along the driving trajectory 13 is schematically illustrated in the present case. The motor vehicle 1 is being reversed into the parking space 9 in the present case. In this case, provision may be made for the motor vehicle 1 to be semi-autonomously manoeuvred along the driving trajectory 13. In this case, the driver assistance system 2 intervenes in the steering of the motor vehicle 1. The driver of the motor vehicle 1 still actuates the accelerator pedal and the brake. Provision may also be made for the motor vehicle 1 to be fully autonomously manoeuvred into the parking space 9. In this case, the driver assistance system 2 additionally intervenes in a drive motor and a brake of the motor vehicle 1.

In the present case, the parking space 9 is bordered by a kerb 12. This kerb 12 is detected on the basis of the sensor data provided by the sensors 4. A relative position between the motor vehicle 1 and the object 8 or the kerb 12 can be determined therefrom by means of the control device 3. In particular, the control device 3 can be used to provide a position value describing the relative position between the motor vehicle 1 and the kerb 12. During the journey of the motor vehicle 1 along the driving trajectory 13, the movement of the motor vehicle 1 is determined using odometry. For this purpose, the revolutions of at least one wheel of the motor vehicle 1 can be evaluated in order to determine the movement of the motor vehicle 1 along the driving trajectory 13. The current steering angle can also be captured in order to determine a direction of travel of the motor vehicle 1. The position value can be continuously updated or adapted during the journey of the motor vehicle 1 along the driving trajectory 13 on the basis of the odometry data. Provision may also be made for the control device 3 to be used to provide a digital environmental map which describes the area 7 surrounding the motor vehicle 1. The motor vehicle 1, the further vehicles 10 and the kerb 12 may be entered in this environmental map.

FIG. 3 shows a schematic flowchart of a method for semi-autonomously manoeuvring the motor vehicle 1. In a step S1, the parking space 9 is detected. For this purpose, the control device 3 can accordingly evaluate the sensor data provided by the sensors 4. In this case, the further vehicles 10 and the kerb 12 can be detected on the basis of the sensor data. In a further step S2, the driving trajectory 13 is determined and the motor vehicle 1 is moved along the driving trajectory 13 into the parking space 9. The position value is continuously updated during the journey of the motor vehicle 1 along the driving trajectory 13. The distance between the motor vehicle 1 or at least one wheel of the motor vehicle 1 and the kerb 12 can therefore also be determined. A step S3 checks whether the kerb 12 has been reached on the basis of the information provided by the position value. If this is not the case, step S3 is carried out again. If it has been determined in step S3 that the kerb 12 has already been reached on the basis of the position value, the method is continued in a step S4.

Step S4 checks whether the at least one wheel and the kerb 12 are actually touching. For this purpose, a motor speed of the drive motor of the motor vehicle 1 can be evaluated, for example. If the motor speed has an increase, it can be assumed that the at least one wheel is in contact with the kerb 12. The kerb 12 is an obstacle to the wheel and must be overcome. It is therefore possible to detect that there is actual contact between the at least one wheel and the kerb 12. If this actual contact is detected, the method is continued in a step S5. In this case, an additional torque is provided by the drive motor, with the result that the motor vehicle 1 can drive onto the kerb 12 or such that the at least one wheel rolls onto the kerb 12.

If it is detected in step S4 that there is no contact between the wheel and the kerb 12, a step S6 is carried out. In this case, it is checked whether the digital environmental map is incorrect. If this is the case, the environmental map is corrected in a step S7. In order to correct the environmental map, the position value can be corrected. In the present case, it emerges from the digital environmental map which is based on the position value that there must already be contact between the wheel and the kerb 12. However, this is not the case in reality.

Figure 4:
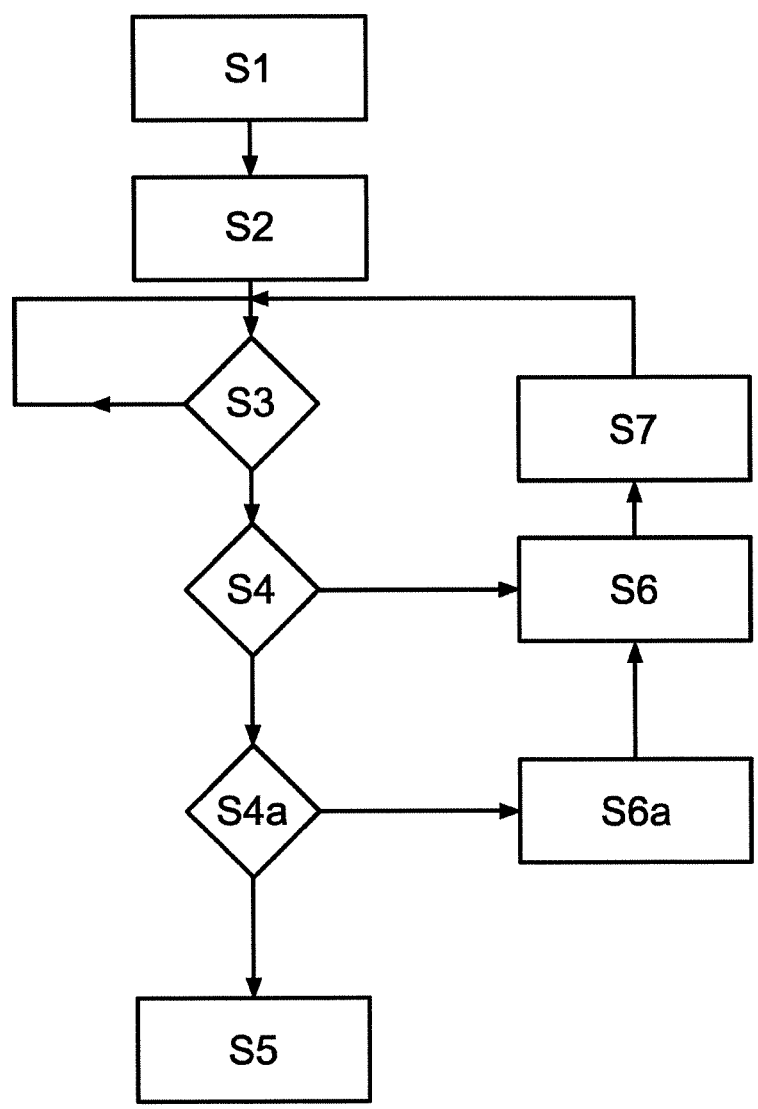
FIG. 4 shows a schematic flowchart of a method for at least semi-autonomously manoeuvring the motor vehicle in a further embodiment.

FIG. 4 shows a schematic flowchart of a method for at least semi-autonomously manoeuvring the motor vehicle 1 in a further embodiment. In this case, an additional step S4a checks whether the wheel speed is negative. Therefore, in addition to checking the motor speed, it is possible to reliably detect whether the at least one wheel is actually touching the kerb 12. Furthermore, an additional step S6a checks whether the digital environmental map is incorrect. Additionally or alternatively, the vehicle speed can be evaluated in order to determine the contact between the at least one wheel and the kerb 12. If the vehicle speed is abruptly reduced, it can be assumed that the at least one wheel has rolled onto the kerb 12. The torque provided by the drive motor can also be examined. The individual methods for determining the contact between the wheel and the kerb 12 can be combined in an arbitrary manner and can be carried out in an arbitrary sequence. This makes it possible to reliably correct the position value.

The invention claimed is:

1. A method for at least semi-autonomously manoeuvring a motor vehicle, comprising:
   determining, using a sensor, a position value describing a current relative position between an object in an area surrounding the motor vehicle and the motor vehicle;
   determining a driving trajectory;
   manoeuvring the motor vehicle along the determined driving trajectory;
   continuously updating the position value during manoeuvring of the motor vehicle on the basis of odometry; and
   detecting contact between at least one wheel of the motor vehicle and the object by capturing a motor speed of a drive motor of the motor vehicle and detecting the contact between the at least one wheel and the object on the basis of an increase in the motor speed,
   wherein the position value is corrected when the contact between the at least one wheel and the object is detected and the position value describes a relative position which differs from the contact between the at least one wheel and the object.

2. The method according to claim 1, wherein when the contact between the at least one wheel and the object is detected, a difference between an actual relative position between the motor vehicle and the object and the relative position described by the position value is determined and the position value is corrected on the basis of the determined difference.

3. The method according to claim 2, wherein the difference is determined on the basis of dimensions of the at least one wheel and/or a position of the at least one wheel relative to a predetermined reference point of the motor vehicle.

4. The method according to claim 1, wherein a digital environmental map which describes the surrounding area is provided, and a position of the motor vehicle and/or of the object in the environmental map is adapted on the basis of the corrected position value.

5. The method according to claim 1, wherein the sensor is also used to detect a parking space in the surrounding area, and the driving trajectory for parking the motor vehicle in the parking space is determined.

6. The method according to claim 5, wherein a kerb which borders the parking space or is arranged inside the parking space is detected as the object.

7. The method according to claim 1, wherein a direction of rotation of the at least one wheel is captured, and the contact between the at least one wheel and the object is detected on the basis of the captured direction of rotation.

8. The method according to claim 1, wherein a current speed of the motor vehicle is captured, and the contact between the at least one wheel and the object is additionally detected on the basis of a change in the captured speed.

9. A driver assistance system for a motor vehicle, the driver assistance system being configured to perform the method according to claim 1.

10. A motor vehicle having a driver assistance system according to claim 9.

11. A method for at least semi-autonomously manoeuvring a motor vehicle, comprising:
   determining, using a sensor, a position value describing a current relative position between an object in an area surrounding the motor vehicle and the motor vehicle;
   determining a driving trajectory;
   manoeuvring the motor vehicle along the determined driving trajectory;
   continuously updating the position value during manoeuvring of the motor vehicle on the basis of odometry; and
   detecting contact between at least one wheel of the motor vehicle and the object,
   wherein the position value is corrected when the contact between the at least one wheel and the object is detected and the position value describes a relative position which differs from the contact between the at least one wheel and the object, and
   wherein a torque provided by the drive motor is captured, and the contact between the at least one wheel and the object is additionally detected on the basis of a change in the captured torque.

12. A method for at least semi-autonomously manoeuvring a motor vehicle, comprising:
   determining, using a sensor, a position value describing a current relative position between an object in an area surrounding the motor vehicle and the motor vehicle;
   determining a driving trajectory;
   manoeuvring the motor vehicle along the determined driving trajectory;
   continuously updating the position value during manoeuvring of the motor vehicle on the basis of odometry; and
   detecting contact between at least one wheel of the motor vehicle and the object,
   wherein the position value is corrected when the contact between the at least one wheel and the object is detected and the position value describes a relative position which differs from the contact between the at least one wheel and the object, and
   wherein when the contact between the at least one wheel and the object is detected, a torque provided by the drive motor for driving the at least one wheel is increased.

* * * * *